(12) United States Patent
Palally et al.

(10) Patent No.: US 11,102,044 B2
(45) Date of Patent: Aug. 24, 2021

(54) HIGH RESOLUTION TIMING ADVANCE ESTIMATION BASED ON PRACH AND SPARSE IFFT ALGORITHM FOR LTE PRACH

(71) Applicant: Parallel Wireless, Inc., Nashua, NH (US)

(72) Inventors: Hemanth Palally, Bangalore (IN); Saikat Senapati, Bangalore (IN); Somasekhar Pemmasani, Bangalore (IN); Ramesh Annavajjala, Nashua, NH (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 16/582,811

(22) Filed: Sep. 25, 2019

(65) Prior Publication Data
US 2020/0099565 A1 Mar. 26, 2020

Related U.S. Application Data

(63) Continuation-in-part of application No. 16/576,369, filed on Sep. 19, 2019.
(Continued)

(51) Int. Cl.
*H04L 27/26* (2006.01)
*H04W 64/00* (2009.01)
*G01S 13/76* (2006.01)

(52) U.S. Cl.
CPC ....... *H04L 27/2659* (2013.01); *H04W 64/00* (2013.01); *G01S 13/76* (2013.01)

(58) Field of Classification Search
CPC ........... H04L 27/2659; H04L 25/03821; H04L 1/0083; H04L 27/2637; H04L 25/0202;
(Continued)

(56) References Cited

U.S. PATENT DOCUMENTS 8,831,150 B1 * 9/2014 Xu ............... H04L 27/2663
375/342
2009/0109919 A1 * 4/2009 Bertrand ......... H04L 27/2633
370/330
(Continued)

FOREIGN PATENT DOCUMENTS

CN 102238580 A 11/2011
CN 104507110 A 4/2015
(Continued)

OTHER PUBLICATIONS

A Grouped Fast Fourier Transform Algorithm Design for Selective Transformed Outputs; Chih-Peng Fan; Guo-An Su; APCCAS 2006-2006 IEEE Asia Pacific Conference on Circuits and Systems; Dec. 4-7, 2006.
(Continued)

*Primary Examiner* — Janice N Tieu
(74) *Attorney, Agent, or Firm* — Michael Y. Saji; David W. Rouille

(57) ABSTRACT

Systems, methods and computer software are disclosed for providing high resolution timing advance estimation based on Physical Random Access Channel (PRACH). An example method includes receiving a preamble signal r(n); performing signal conditioning on r(n); down sampling the signal and performing antialiasing filtering to provide a y(n) signal; correlating y(n) with a reference preamble with a reference preamble sequence c(n) to provide correlation output Ryc; using a peak value P of the correlation output Ryc to detect a preamble ID and a timing advance; constructing a sequence s(n) by segmenting r_centered(n) for length L around an index P*24; performing time domain interpolation of c(n) around index P to obtain a sequence c_interpolated(n); performing time domain interpolation between sequences s(n) and c_interpolated(n); detecting a
(Continued)

peak position Q of the correlation; and deriving TA as P*24−L/2+q in terms of Ts.

7 Claims, 18 Drawing Sheets

Related U.S. Application Data

(60) Provisional application No. 62/736,341, filed on Sep. 25, 2018, provisional application No. 62/741,938, filed on Oct. 5, 2018.

(58) Field of Classification Search
CPC ........... H04L 27/2601; H04L 27/2697; H04W 64/00; H04W 74/0866; H04W 56/00; G01S 13/76; H04J 13/10; H04J 13/18; H04J 14/0298; H04B 7/0697
See application file for complete search history.

(56) References Cited

U.S. PATENT DOCUMENTS

| | | | |
|---|---|---|---|
| 2010/0158050 A1* | 6/2010 | Yang | H04L 27/2647 370/498 |
| 2017/0006638 A1* | 1/2017 | Sahlin | H04L 27/2613 |
| 2017/0013513 A1 | 1/2017 | Agarwal et al. | |
| 2017/0019375 A1 | 1/2017 | Garg et al. | |
| 2017/0026845 A1 | 1/2017 | Garg et al. | |
| 2017/0048710 A1 | 2/2017 | Agarwal et al. | |
| 2017/0055186 A1 | 2/2017 | Donepudi et al. | |
| 2017/0064621 A1 | 3/2017 | Garg et al. | |
| 2017/0070436 A1 | 3/2017 | Lubenski et al. | |
| 2017/0077979 A1 | 3/2017 | Papa et al. | |
| 2017/0111482 A1 | 4/2017 | Mishra et al. | |
| 2017/0127409 A1 | 5/2017 | Mishra et al. | |
| 2017/0171828 A1 | 6/2017 | Rao et al. | |
| 2017/0181119 A1 | 6/2017 | Garg | |
| 2017/0202006 A1 | 7/2017 | Rao et al. | |
| 2017/0208560 A1 | 7/2017 | Papa et al. | |
| 2017/0238278 A1 | 8/2017 | Yadav | |
| 2017/0257133 A1 | 9/2017 | Papa et al. | |
| 2017/0272330 A1 | 9/2017 | Cao et al. | |
| 2017/0273134 A1 | 9/2017 | Cao et al. | |
| 2017/0288813 A1 | 10/2017 | Khan et al. | |
| 2017/0295510 A1 | 10/2017 | Sharma et al. | |
| 2017/0303163 A1 | 10/2017 | Sharma et al. | |

FOREIGN PATENT DOCUMENTS

| | | |
|---|---|---|
| KR | 20110124027 A | 11/2011 |
| KR | 101817290 B1 | 2/2018 |

OTHER PUBLICATIONS

Secure User Plane Location Architecture; Candidate Version 2.0 —Jun. 27, 2008; Open Mobile Alliance OMA-AD-SUPL-V2_0-20080627-C.

ETSI TS 136 214 V10.1.0 ; Apr. 2011; Technical Specification LTE; Evolved Universal Terrestrial Radio Access (E-UTRA); Physical layer; Measurements (3GPP TS 36.214 version 10.1.0 Release 10).

* cited by examiner

HIGH RESOLUTION TIMING ADVANCE ESTIMATION BASED ON PRACH AND SPARSE IFFT ALGORITHM FOR LTE PRACH

CROSS-REFERENCE TO RELATED APPLICATIONS

This application is a continuation-in-part of, and claims priority under 35 U.S.C. § 120 to, U.S. patent application Ser. No. 16/576,369, titled "High Resolution Timing Advance Estimation Based on PRACH" and filed on Sep. 19, 2019, itself a non-provisional conversion of U.S. Provisional Pat. App. No. 62/773,466, each hereby incorporated by reference in its entirety for all purposes; this application also claims priority under 35 U.S.C. § 119(e) to U.S. Provisional Pat. App. No. 62/736,341, filed Sep. 25, 2018, titled "Enhancing UE Position Accuracy Using PRACH in LTE Network" which is hereby incorporated by reference in its entirety for all purposes; this application also claims priority under 35 U.S.C. § 119(e) to U.S. Provisional Pat. App. No. 62/741,938, filed Oct. 5, 2018, titled "Sparse IFFT Algorithm for LTE PRACH" which is hereby incorporated by reference in its entirety for all purposes. This application also hereby incorporates by reference U.S. patent application Ser. No. 15/241,060, entitled "Cell ID Disambiguation" and filed Aug. 18, 2016, which itself is a non-provisional conversion of, and claims the benefit of priority under 35 U.S.C. § 119(e) to U.S. Provisional Pat. App. No. 62/206,666, filed Aug. 18, 2015 with title "Cell ID Disambiguation," each hereby incorporated by reference in its entirety. As well, U.S. Pat. No. 8,867,418 and U.S. Pat. App. No. 20140133456 are also hereby incorporated by reference in their entireties. The present application hereby incorporates by reference U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "MaxMesh: Mesh Backhaul Routing," filed Apr. 18, 2016, each in its entirety for all purposes. This application also hereby incorporates by reference in their entirety each of the following U.S. Pat. applications or Pat. App. Publications: US20150098387A1 (PWS-71731US01); US20170055186A1 (PWS-71815U501); US20170273134A1 (PWS-71850U501); US20170272330A1 (PWS-71850U502); and Ser. No. 15/713,584 (PWS-71850US03).

This application hereby incorporates by reference, for all purposes, each of the following U.S. Patent Application Publications in their entirety: US20170013513A1; US20170019375A1; US20170026845A1; US20170048710A1; US20170055186A1; US20170064621A1; US20170070436A1; US20170077979A1; US20170111482A1; US20170127409A1. US20170127409A1; US20170171828A1; US20170181119A1; US20170202006A1; US20170208560A1; US20170238278A1; US20170257133A1; US20170272330A1; US20170273134A1; US20170273134A1; US20170288813A1; US20170295510A1; US20170303163A1.

BACKGROUND

The ability both to locate an object and to communicate with it is a combination that enables a wide range of location-based services—from navigator-like map services to location-based advertising to tracking children, cars or even convicted criminals. This provides a natural motivation for mobile phones to have positioning capabilities. Another strong motivation is a requirement from the Federal Communications Commission (FCC) of the USA that emergency calls, whether fixed or mobile, can be located with a high degree of accuracy.

The first version of LTE (Release 8) does not provide any direct protocol support for locating the User Equipment (UE). However, a Release 8 LTE UE can nonetheless be located by means of Assisted Global Navigation Satellite System (A-GNSS) and Enhanced Cell-ID-based techniques in conjunction with a general-purpose positioning protocol known as Secure User Plane Location (SUPL), defined by the Open Mobile Alliance (OMA). SUPL operates as a service in the application layer and requires only a normal User Plane (UP) connection between a server in the network (known in OMA as a SUPL Location Platform (SLP) and in LTE as an Evolved Serving Mobile Location Centre (E-SMLC)) and the SUPL client application in the UE.

Timing advance corresponds to the length of time a signal takes to reach the base station from a mobile phone. This length of time can be used to determine the distance to the mobile phone. The basic timing unit for LTE, represented by $T_S$, is 1/30720000 seconds, the basis of which is the sampling rate for 2048 FFT size implementation of OFDM for subcarrier spacing of $\Delta f=15$ kHz (i.e., $T_S=1/\Delta f_{ref} \cdot N_{f,ref}$), with subcarrier spacing of 15 kHz). The basic timing unit for 5G NR is represented by $T_C$ and $T_C=1/(\Delta f_{max} \cdot N_f)$, where $\Delta f_{max}$ is the subcarrier spacing and $N_f$ is the FFT size.

SUMMARY

Systems and methods are disclosed for enhancing User Equipment (UE) position accuracy using on Physical Random-Access Channel (PRACH) in Long Term Evolution (LTE) network. In an LTE system, UE uses PRACH physical channel in the uplink direction to get initial access and to synchronize with the network. As part of this synchronization process eNode must estimate the Timing Advance to be used by the UE to ensure all its transmissions are aligned with frame boundaries. A typical requirement for the accuracy of TA as defined by the 3GPP standard is 16Ts. However, some networks have the need to estimate TA with a much higher resolution. LPPa protocol is used in LTE networks for finding UE position for emergency services. This protocol expects Physical layer to report the timing advance (TA) with higher resolution of 2Ts.

Systems and methods are disclosed to efficiently compute IFFT transformed outputs as applied to High resolution timing advance estimation in LTE PRACH receiver for eNodeB. A large IFFT of size 16K is required to estimate the Timing Advance with a resolution of 2Ts. Conventional IFFT proves to be computationally expensive for this application as we need to compute only selective transformed outputs. The proposed method exploits the sparsity in both input and output to significantly reduce the computations.

In one embodiment, a method may be disclosed for enhancing UE position accuracy using Physical Random Access Channel (PRACH). In one embodiment the method includes receiving a preamble signal r(n) having a predetermined sampling frequency and a predetermined length; performing signal conditioning on r(n) to provide a r_centered(n) signal; down sampling the r_centered(n) signal by a factor of 24 and performing antialiasing filtering to provide a y(n) signal; correlating y(n) with a reference preamble c(n) a down sampled version of the received preamble with a reference preamble sequence c(n) using an FFT method to provide correlation output Ryc; using a peak value P of the correlation output Ryc to detect a preamble ID and a timing advance at a resolution of 16Ts; constructing a sequence s(n) by segmenting r_centered(n) for length L around an index P*24; performing time domain interpolation of c(n) around index P to obtain a sequence c_interpolated(n); performing time domain interpolation between sequences s(n) and c_interpolated(n); detecting a peak position Q of the correlation; and deriving TA as P*24−L/2+q in terms of Ts.

The method may further comprise retrieving a PRACH preamble format table to interpret the preamble identifier. The timing advance value has a resolution of 2 Ts or finer. The method may further comprise performing a grouped FFT algorithm for selective transformed outputs to generate the second correlation function R_hat. The method may further comprise performing cyclic prefix removal, frequency shifting, and downsampling on the received preamble. The preamble may be a portion of a orthogonal frequency division multiplexed (OFDM) signal. The method may further comprise retrieving the reference preamble or the reference time-domain preamble from a storage medium. The preamble may be a preamble of a Long Term Evolution (LTE) or 5G Physical Random Access Channel (PRACH) radio signal, and In another embodiment, a non-transitory computer-readable medium containing instructions for enhancing UE position accuracy using Physical Random Access Channel (PRACH) is disclosed. The non-transitory computer-readable medium instructions, when executed, cause a processing device to perform steps including receiving a preamble signal r(n) having a predetermined sampling frequency and a predetermined length; performing signal conditioning on r(n) to provide a r_centered(n) signal; down sampling the r_centered(n) signal by a factor of 24 and performing antialiasing filtering to provide a y(n) signal; correlating y(n) with a reference preamble c(n) a down sampled version of the received preamble with a reference preamble sequence c(n) using an FFT method to provide correlation output Ryc; using a peak value P of the correlation output Ryc to detect a preamble ID and a timing advance at a resolution of 16Ts; constructing a sequence s(n) by segmenting r_centered(n) for length L around an index P*24; performing time domain interpolation of c(n) around index P to obtain a sequence c_interpolated(n); performing time domain interpolation between sequences s(n) and c_interpolated(n); detecting a peak position Q of the correlation; and deriving TA as P*24−L/2+q in terms of Ts.

In another embodiment a system for enhancing UE position accuracy using Physical Random Access Channel (PRACH) is disclosed. The system includes a processing device which performs steps comprising: receiving a preamble signal r(n) having a predetermined sampling frequency and a predetermined length; performing signal conditioning on r(n) to provide a r_centered(n) signal; down sampling the r_centered(n) signal by a factor of 24 and performing antialiasing filtering to provide a y(n) signal; correlating y(n) with a reference preamble c(n) a down sampled version of the received preamble with a reference preamble sequence c(n) using an FFT method to provide correlation output Ryc; using a peak value P of the correlation output Ryc to detect a preamble ID and a timing advance at a resolution of 16Ts; constructing a sequence s(n) by segmenting r_centered(n) for length L around an index P*24; performing time domain interpolation of c(n) around index P to obtain a sequence c_interpolated(n); performing time domain interpolation between sequences s(n) and c_interpolated(n); detecting a peak position Q of the correlation; and deriving TA as P*24−L/2+q in terms of Ts.

The preamble may be a preamble of a Long Term Evolution (LTE) or 5G Physical Random Access Channel (PRACH) radio signal, and the method may further comprise retrieving a PRACH preamble format table to interpret the preamble identifier. The timing advance value has a resolution of 2 Ts or finer. The method may further comprise performing a grouped FFT algorithm for selective transformed outputs to generate the second correlation function R_hat. The method may further comprise performing cyclic prefix removal, frequency shifting, and downsampling on the received preamble. The preamble may be a portion of a orthogonal frequency division multiplexed (OFDM) signal. The method may further comprise retrieving the reference preamble or the reference time-domain preamble from a storage medium.

In another embodiment, a method using a sparse IFFT algorithm for Physical Random Access Channel (PRACH) is presented. The method includes defining, in an FFT of a transmitted preamble, a search window L within which a peak Q is located, the center of the search window S equal to 16P; defining two points A and B that are equidistant on either side of S; computing, using a grouped FFT, a transformed output at point A and point B; choosing between point A and point B whichever has a greater magnitude; using the magnitude and index for the greater magnitude, a first equation, and a second equation to define a narrow search zone Z; computing transformed outputs within search zone Z; and finding a position of the maximum from the transformed outputs.

In another embodiment, a non-transitory computer-readable medium containing instructions for a sparse IFFT algorithm for Physical Random Access Channel (PRACH) is disclosed. The non-transitory computer-readable medium instructions, when executed, cause a processing device to perform steps including The method includes defining, in an FFT of a transmitted preamble, a search window L within which a peak Q is located, the center of the search window S equal to 16P; defining two points A and B that are equidistant on either side of S; computing, using a grouped FFT, a transformed output at point A and point B; choosing between point A and point B whichever has a greater magnitude; using the magnitude and index for the greater magnitude, a first equation, and a second equation to define a narrow search zone Z; computing transformed outputs within search zone Z; and finding a position of the maximum from the transformed outputs.

In another embodiment a system for a sparse IFFT algorithm for Physical Random Access Channel (PRACH) is disclosed. The system includes a processing device which performs steps comprising defining, in an FFT of a transmitted preamble, a search window L within which a peak Q is located, the center of the search window S equal to 16P;

defining two points A and B that are equidistant on either side of S; computing, using a grouped FFT, a transformed output at point A and point B; choosing between point A and point B whichever has a greater magnitude; using the magnitude and index for the greater magnitude, a first equation, and a second equation to define a narrow search zone Z; computing transformed outputs within search zone Z; and finding a position of the maximum from the transformed outputs.

DETAILED DESCRIPTION

We are looking for Positioning based on Cell-ID (CID) which uses geographical knowledge of a UE's serving cell. To improve the accuracy, measurements made by the UE and/or the eNodeB can be utilized in addition.

Basic CID positioning estimates the location of a UE using only the coordinates of its serving eNodeB. Typically, basic CID positioning provides only coarse estimation of the UE location, with accuracy of roughly the same order as the cell radius.

Enhanced CID positioning uses additional information beyond the identity of the eNodeB that is serving the UE. The distance of a UE from its serving eNodeB or cell can be estimated from the Round Trip Time (RTT). Two measurements are defined in LTE Release 9 by which an eNodeB can indicate the RTT to the E-SMLC, namely 'Timing Advance Type 1' and 'Timing Advance Type 2'. A diagram of type 1 and type 2 timing advance are shown in FIG. 1.

Type 1 and type 2 Timing Advance definition is mentioned in 3GPP spec 36.214 section 5.2.4, which is hereby incorporated by reference.

| Definition | Type1:<br>Timing advance ($T_{ADV}$) type 1 is defined as the time difference<br>$T_{ADV}$ = (eNB Rx − Tx time difference) + (UE Rx − Tx time difference), where the eNB Rx − Tx time difference corresponds to the same UE that reports the UE Rx − Tx time difference.<br>Type2:<br>Timing advance ($T_{ADV}$) type 2 is defined as the time difference<br>$T_{ADV}$ = (eNB Rx − Tx time difference), where the eNB Rx − Tx time difference corresponds to a received uplink radio frame containing PRACH from the respective UE. |
|---|---|

Figure 2:
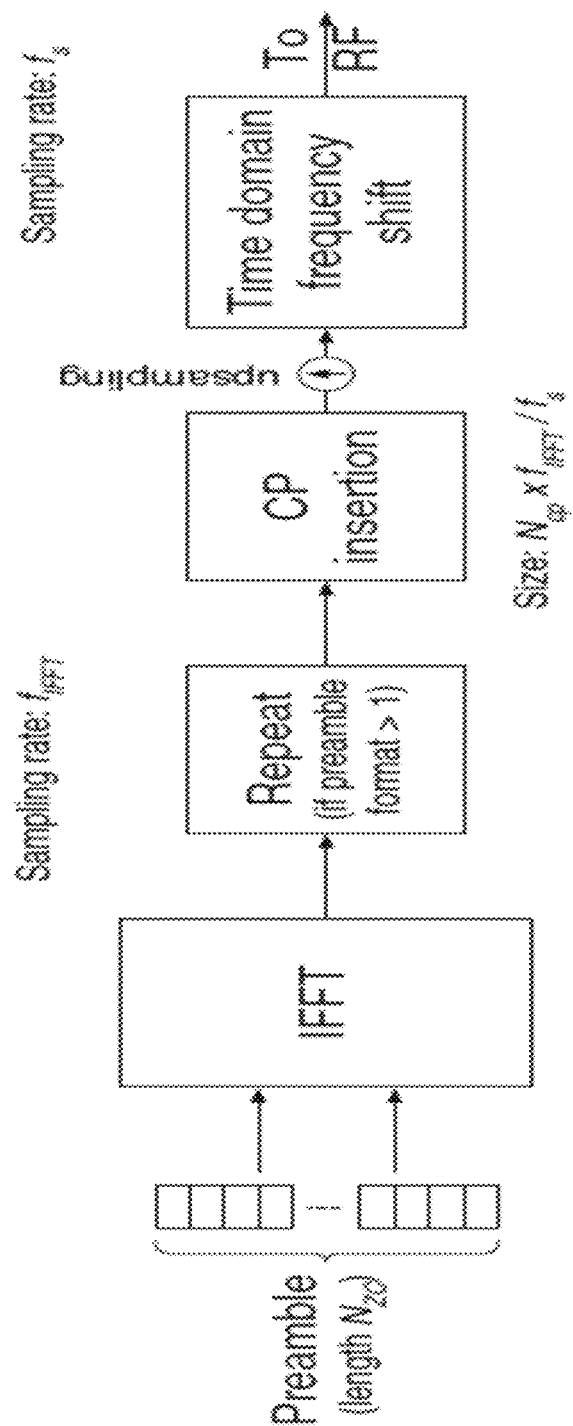
FIG. 2 is a diagram showing processing for conventional timing advance estimation.

Physical Random Access Channel (PRACH) is used to achieve uplink time synchronization for a UE which either has not yet acquired, or has lost, its uplink synchronization. A successful PRACH attempt should allow subsequent UE transmissions to be inserted among the scheduled synchronized transmissions of other UEs. This sets the required timing estimation accuracy which must be achievable from the PRACH decoding at eNB PRACH Transmitter Most convenient implementation of PRACH transmitter in the UE is to generate the preamble using smallest possible IFFT and shifting the preamble to the required frequency location through time-domain up sampling and filtering (commonly known as hybrid frequency/time domain PRACH generation shown in the FIG. 2). Given that the preamble sequence based on Zadoff-Chu of length is 839, the smallest IFFT size that can be used is 1024, resulting in a sampling frequency of 1.28 Msps. Both the CP and sequence durations have been designed to provide an integer number of samples at this sampling rate. The CP can be inserted before the up sampling and time-domain frequency Shift.

Figure 1A:
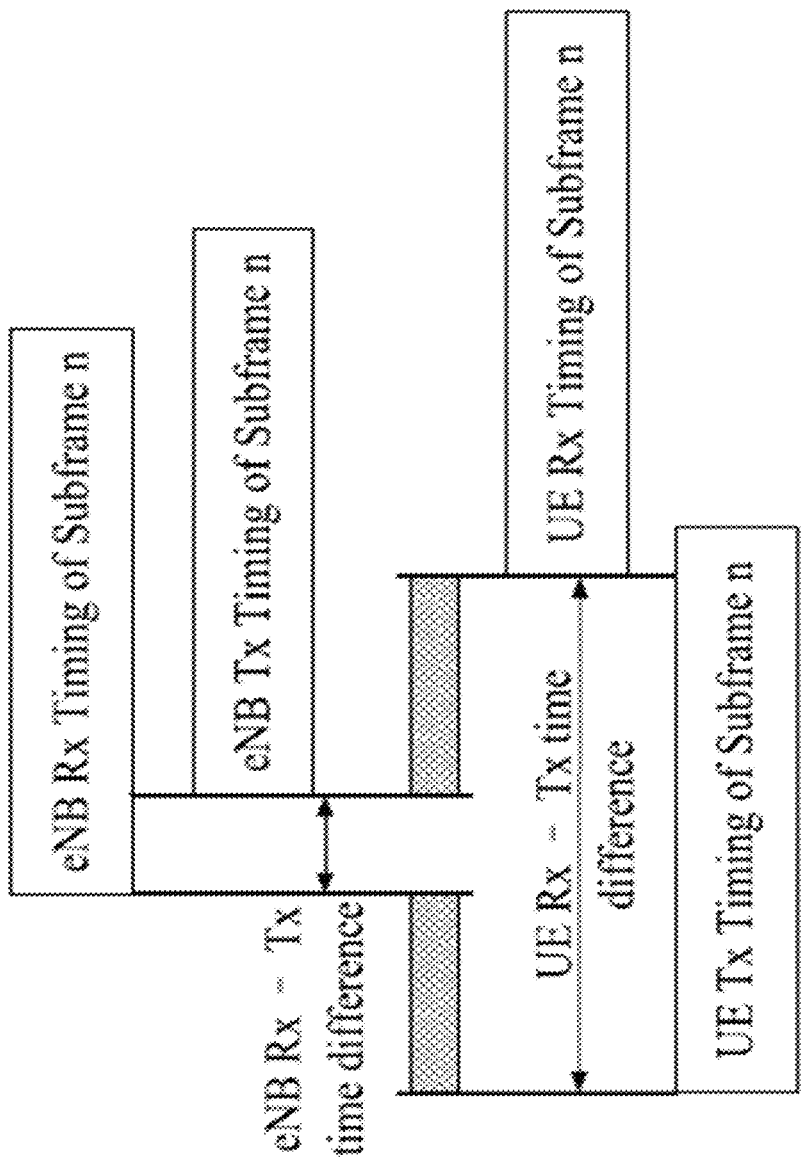
FIG. 1A is a diagram showing type 1 and type 2 timing advance definitions.
Figure 1B:
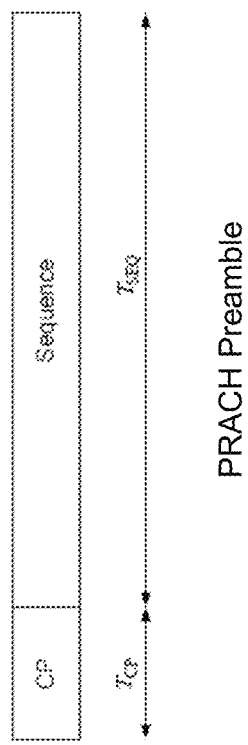
FIG. 1B is a diagram showing a PRACH preamble structure.

A PRACH Preamble structure is shown in FIG. 1B.

PRACH Formats

| Preamble format | $T_{CP}$ | $T_{SEQ}$ |
|---|---|---|
| 0 | 3168 · $T_s$ | 24576 · $T_s$ |
| 1 | 21024 · $T_s$ | 24576 · $T_s$ |
| 2 | 6240 · $T_s$ | 2 · 24576 · $T_s$ |
| 3 | 21024 · $T_s$ | 2 · 24576 · $T_s$ |
| 4* | 448 · $T_s$ | 4096 · $T_s$ |

As described above Type 2 Measurement report of LPPa protocol requires 2Ts/8Ts resolution timing advance to better locate UE positioning. Physical layer is responsible for decoding PRACH Preamble and its corresponding Timing Advance (TA) and report to higher layers. Traditional measurement report gets 16Ts timing resolution from Physical layer (PHY) which boils down to approx. 80 meters range of UE positioning. As part of LPPa requirement, PHY is required to report Timing Advance with higher accuracy of 2Ts. This 2Ts resolution will give UE positioning accuracy up to 10 meters.

Solution to Problem

The current implementation of the PRACH detector estimates the timing advance with the accuracy of 16Ts. The proposed method works in tandem with the existing implementation to estimate the TA with higher resolution of 2Ts. A key insight is that the timing offset can be determined from the correlation of the received PRACH preamble with the reference received preamble. In other words, the transmitted preamble is known to be an interpolated or upsampled version of the original short preamble sequence.

Figure 3:
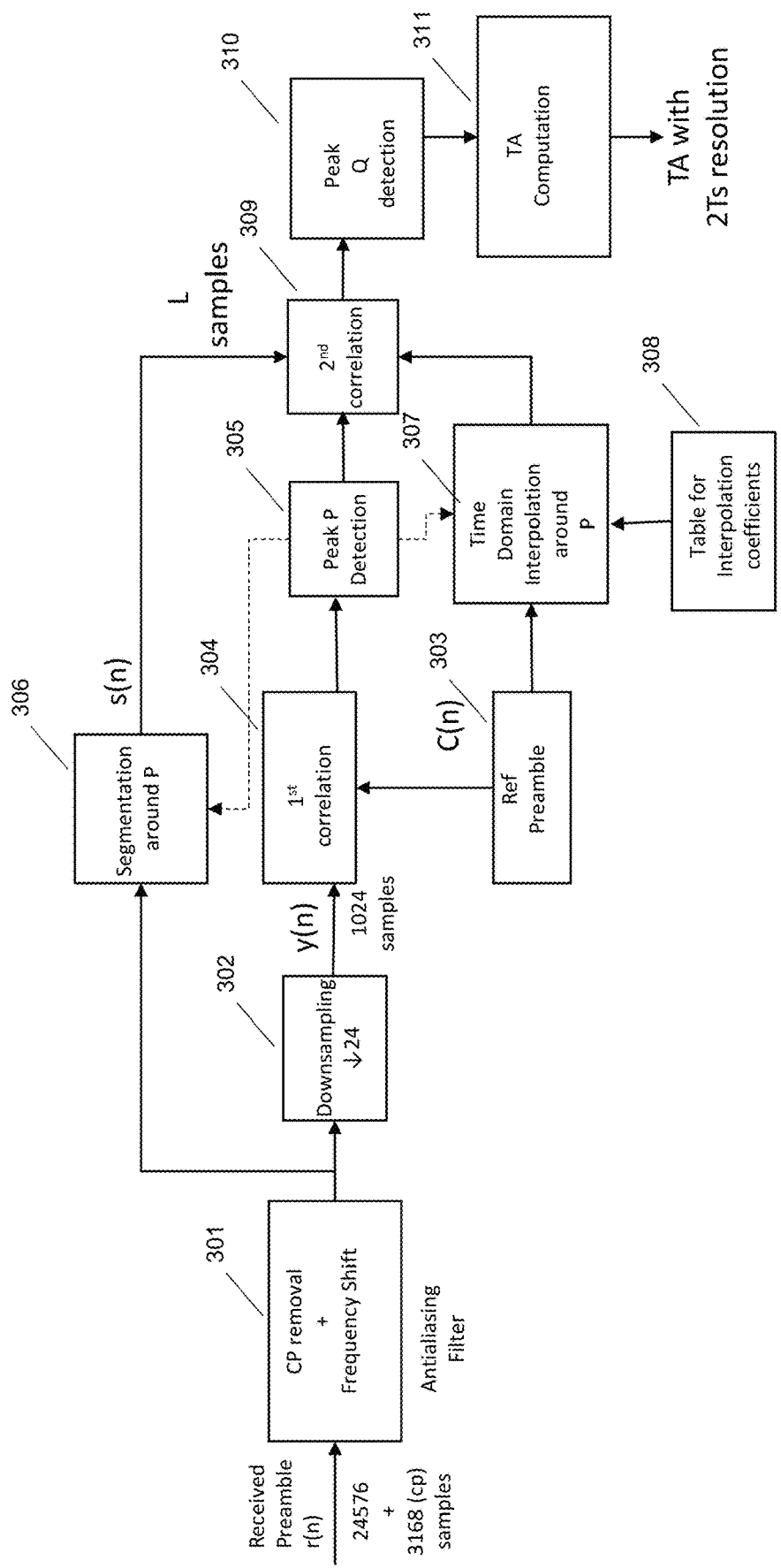
FIG. 3 is a diagram showing processing for timing advance estimation, in accordance with some embodiments.

The processing steps required in the method are as follows, and are shown in FIG. 3.

The current implementation of the PRACH detector estimates the timing advance with the accuracy of 16Ts. The proposed method works in tandem with the existing implementation to estimate the TA with higher resolution of 2Ts.

This method removes the need for large IFFT as we are performing correlation and interpolation in time domain.

The processing steps required in the method are as follows

The received preamble signal r(n) has the sampling frequency of 30.72 Msps and is 27744 samples long. The following signal conditioning operations are performed on r(n)

At 301, cyclic prefix is removed, and only Preamble sequence is extracted. The resulting sequence will be 24576 samples long The positioning of the signal in the frequency domain is determined by the factor n_PRB_Offset. The signal is shifted in frequency by n_PRB_Offset so that it is centered about DC.

Anti-alias filtering in time domain to remove out of band noise. Let the resulting signal be denoted as r_centred(n)

At 302, the frequency centered signal is down sampled by a factor of 24 after performing antialiasing filtering. Let this signal be called Y(n). At 303, a reference preamble may be used.

At 304, the down sampled version of the received preamble is correlated with the reference preamble sequence c(n) using the FFT method as below $$Ryc = ifft\{Y(k) \cdot C^*(k)\}$$

Where Y(k) and C(k) are 1024-point FFT of y(n) and c(n) respectively

At 305, the peak position P of the correlation output Ryc is used to detect the preamble ID and the Timing advance at a resolution of 16Ts At 306, we construct a sequence s(n) by segmenting r_centred(n) for length L centered around the index P*24.

At 307, we perform time domain interpolation of the reference preamble c(n) around the index P to get a sequence c_interpolated(n). At 308, a table for interpolation coefficients may be used As we know that the transmitted preamble is constructed by interpolating only the 839 samples preamble sequence, the interpolation coefficients can be derived beforehand and stored in a LUT. Here we are exploiting the fact that the preamble at sampling rate of Fs=30.72 Msps is highly correlated in nature.

Perform time domain interpolation between the sequences s(n) and c_interpolated(n).

At 310, detect the peak position Q of the correlation from 309.

At 311, TA can be derived as P*24−L/2+Q in terms of Ts.

The insight that the timing offset can be determined from the correlation of the received PRACH preamble with the reference received preamble also means that the equivalent correlation could be performed in any other RAT with an equivalent PRACH. The PRACH preamble structure used in 5G NR is exactly the same as that used in 4G. So all high resolution timing advance (HRTA) related methods included herein can be used for 5G.

The standard LTE conformance requires the timing advance to be done with an Accuracy of 16Ts. We are estimating it at a higher resolution of 2Ts. This is useful for public safety networks using LTE or 5G technology base stations.

In this method we have to store the sequence c centered(n) in the memory till we find the peak P. So, we are making a tradeoff between memory usage and computation complexity.

This method is designed to be performed at the base station.

In various embodiments, this method can be designed to be performed at the base station or could be performed anywhere where sufficient processing power is available, including at a baseband unit colocated or remotely located relative to the base station. No modification is required to the UE.

It is noted that the PRACH preamble structure used in 5G NR (New Radio) is exactly the same as that used in 4G, so the methods disclosed herein could be used by one having skill in the art at a 5G base station or in a 5G network. It is noted that different PRACH preamble structures could be standardized and used, and, when used in combination with the presently disclosed methods and new RF technologies, could provide UE positioning with greater resolution than 2 Ts.

The timing advance values derived using the presently described methods could be used, in some embodiments, for UE location/positioning; responding to UE paging requests; reporting UE location to the core network; plotting UE location on a map; using UE location for compliance with governmental requirements for location services and/or emergency services; optimizing beamforming for MIMO applications; optimizing UE location for purposes of assessing handover and inter-cell interference coordination (ICIC), etc. The timing advance values derived using the presently described methods could, in the case of a UE that is a smart watch or smart fob or smart tag, be used to locate the UE within a small radius.

Figure 4:
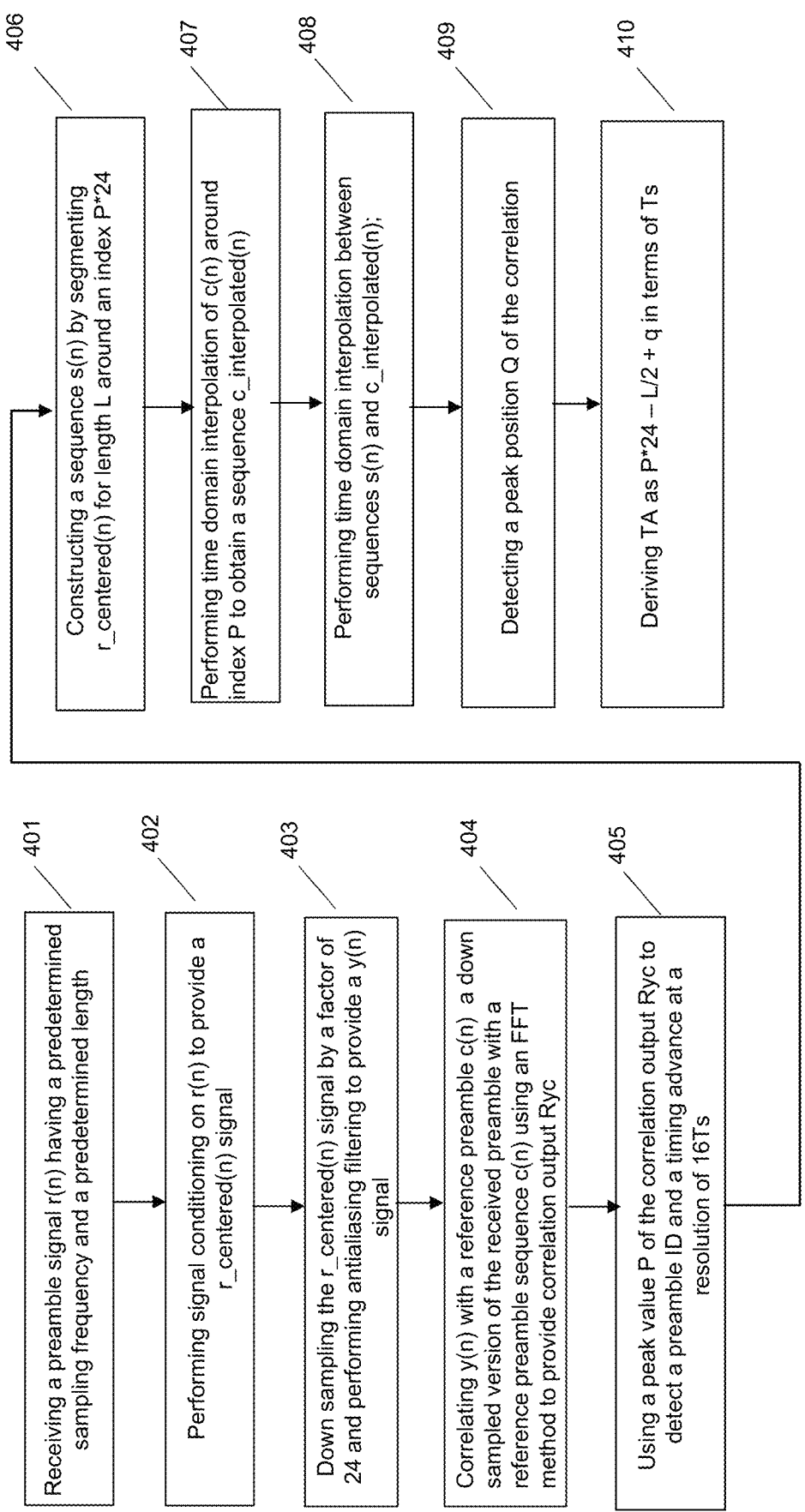
FIG. 4 is a flow diagram for one embodiment of a method for enhancing UE position accuracy using Physical Random Access Channel (PRACH), in accordance with some embodiments.

FIG. 4 is a flow diagram of a first embodiment of a method for enhancing UE position accuracy using Physical Random Access Channel ((PRACH). The method includes receiving a preamble signal r(n) having a predetermined sampling frequency and a predetermined length (401); performing signal conditioning on r(n) to provide a r_centered (n) signal (402); down sampling the r_centered(n) signal by a factor of 24 and performing antialiasing filtering to provide a y(n) signal (403); correlating y(n) with a reference preamble c(n) a down sampled version of the received preamble with a reference preamble sequence c(n) using an FFT method to provide correlation output Ryc (404); using a peak value P of the correlation output Ryc to detect a preamble ID and a timing advance at a resolution of 16Ts (405); constructing a sequence s(n) by segmenting r_centered(n) for length L around an index P*24 (406); performing time domain interpolation of c(n) around index P to obtain a sequence c_interpolated(n) (407); performing time domain interpolation between sequences s(n) and c_interpolated(n) (408); detecting a peak position Q of the correlation (409); and deriving TA as P*24−L/2+q in terms of Ts (410).

The block diagram of a typical LTE PRACH receiver with High resolution timing advance estimation capability is as shown in FIG. 1A. The most computationally expensive module in the receiver is IFFT of size 16K (module 2 in FIG. 2). Most commonly used IFFT algorithm has the order of complexity O(Nlog2N), where N is the IFFT size. So, for 16K IFFT, we would require around 16384*log 2 (16384)=229376 complex multiplications and additions to process one PRACH symbol. This is a tremendous load on the DSP processor and can affect the overall performance of the eNodeB receiver. So, it is crucial to reduce the complexity of the IFFT and demands for a novel approach.

Figure 5:
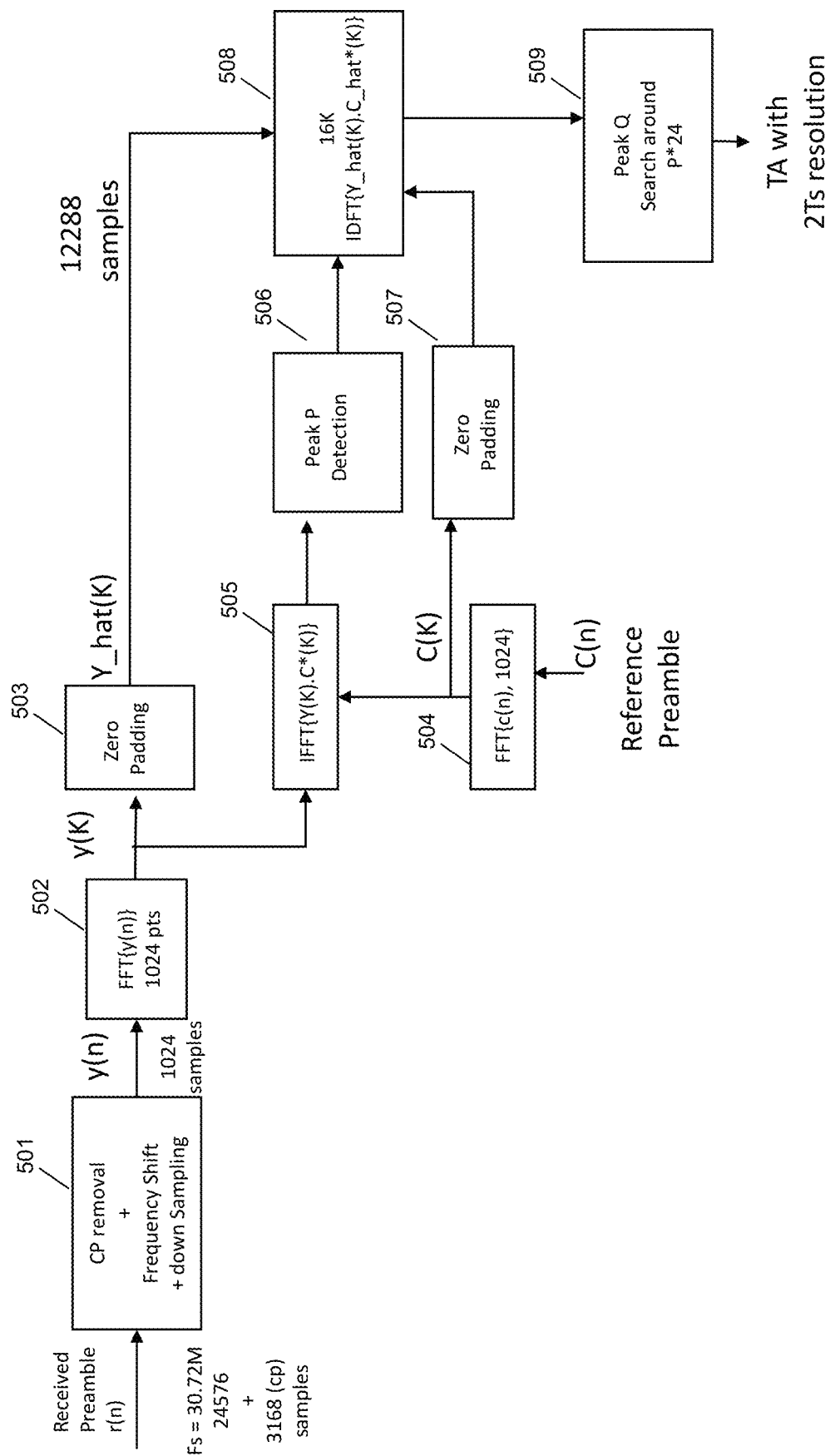
FIG. 5 is a block diagram of a PRACH receiver use d or high resolution timing advance, in accordance with some embodiments.
Figure 6:
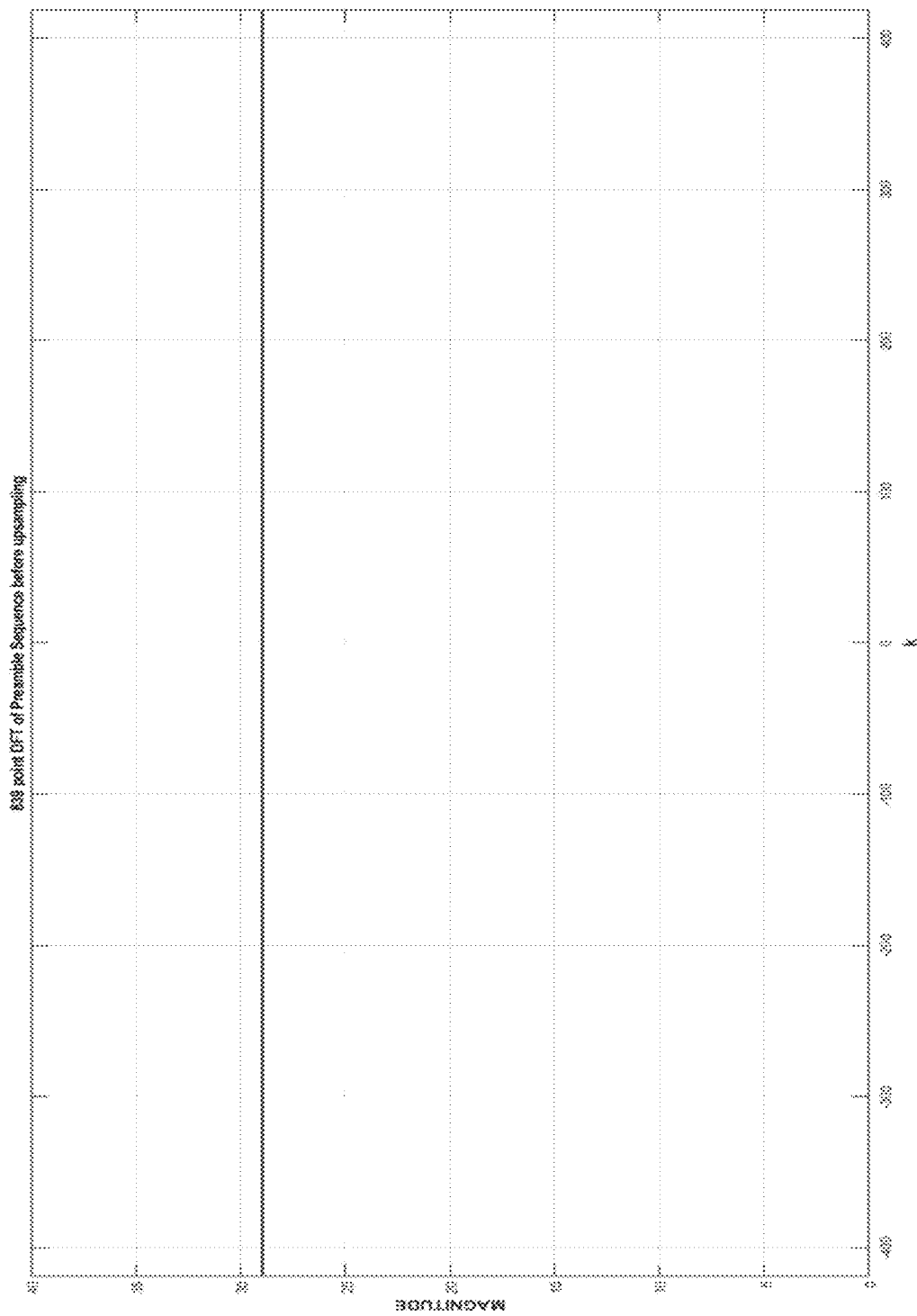
FIG. 6 is a graph showing a DFT of 839-point PRACH preamble, in accordance with some embodiments.

First, we explain the properties of the received PRACH signal that we use in the proposed method and in the second section we provide the steps involved in the proposed method Property1: PRACH signal is inherently Windowed in Frequency Domain It can be seen from FIG. 5 that the transmitted preamble is the up sampled or interpolated version of the basic preamble sequence of length 839. As the basic preamble sequence is completely random, its DFT is flat (FIG. 6).

Figure 7:
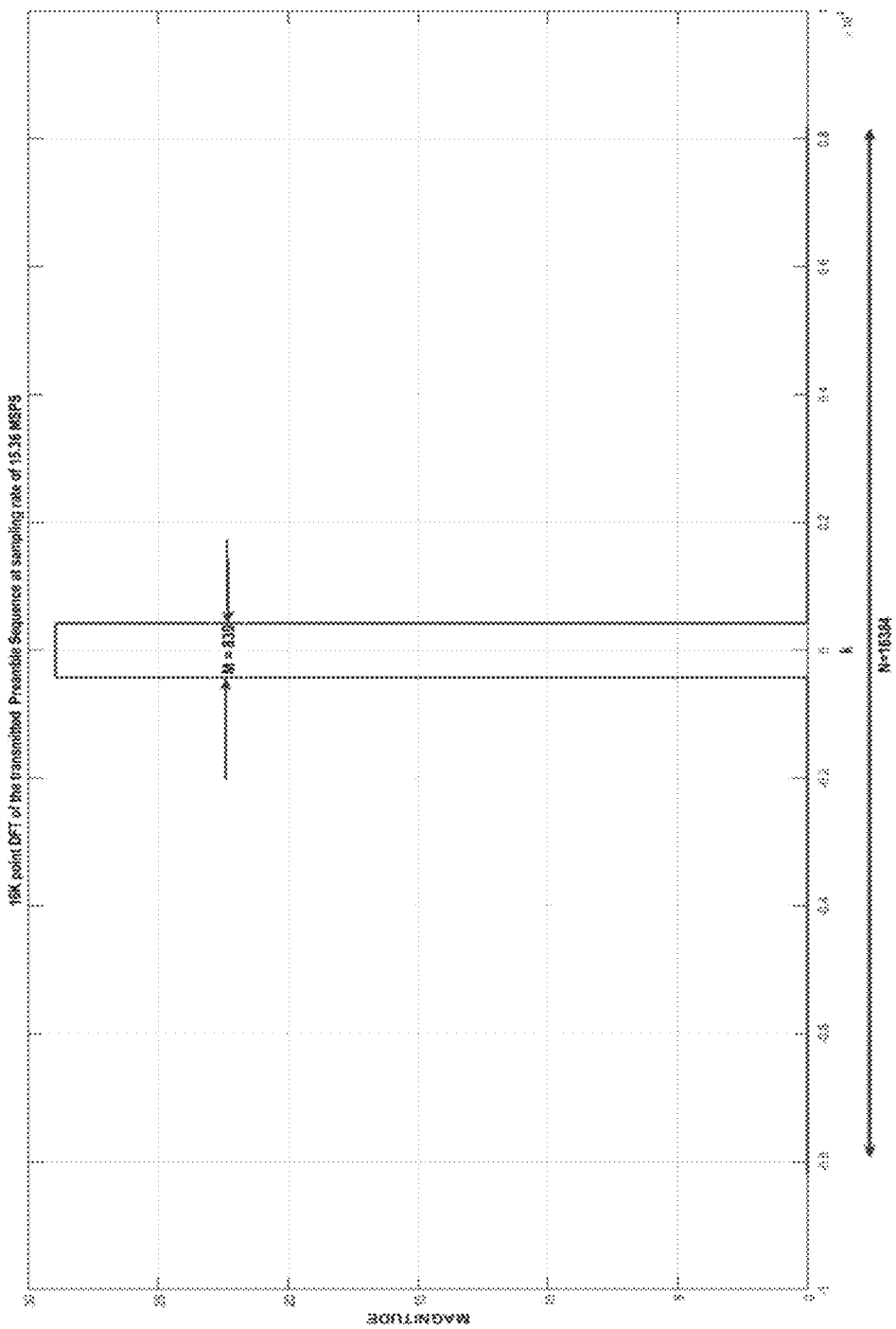
FIG. 7 is a graph showing a 16K FFT of the transmitted preamble, in accordance with some embodiments.

However, DFT of the transmitted preamble (FIG. 7) is a rectangular pulse (also called as Boxcar or Dirichlet window) with pulse width 839 defined as below $W(k)=1, -419 \le k \le 419$ $W(k)=0$, otherwise The IFFT of $W(k) \to w(n)$ is a sinc function defined as below $$w(n) = \frac{\sin\left(\frac{\pi n M}{N}\right)}{\sin\left(\frac{\pi n}{N}\right)} \quad \text{Eq 1}$$

M=839, N=16384

Figure 8:
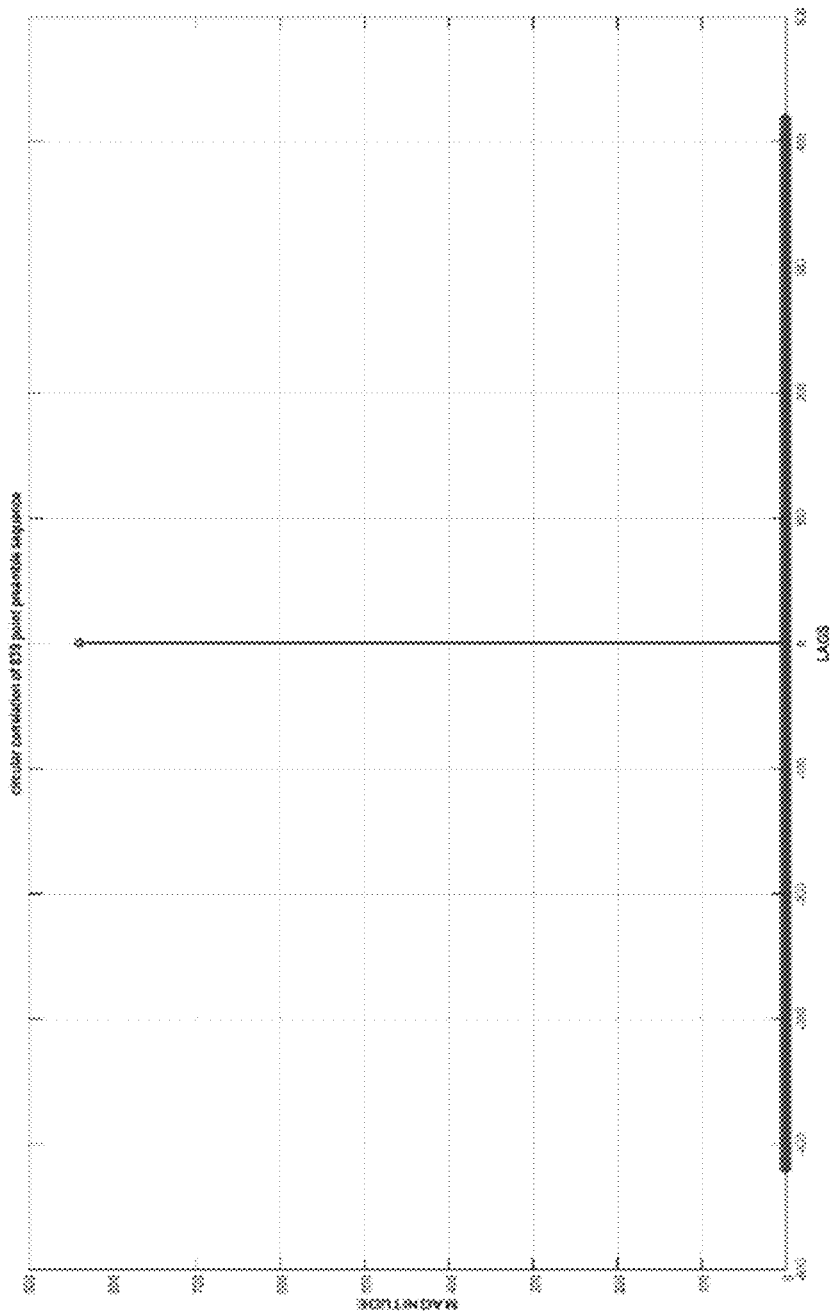
FIG. 8 is a graph showing a circular correlation of 839-point PRACH preamble, in accordance with some embodiments.
Figure 9:
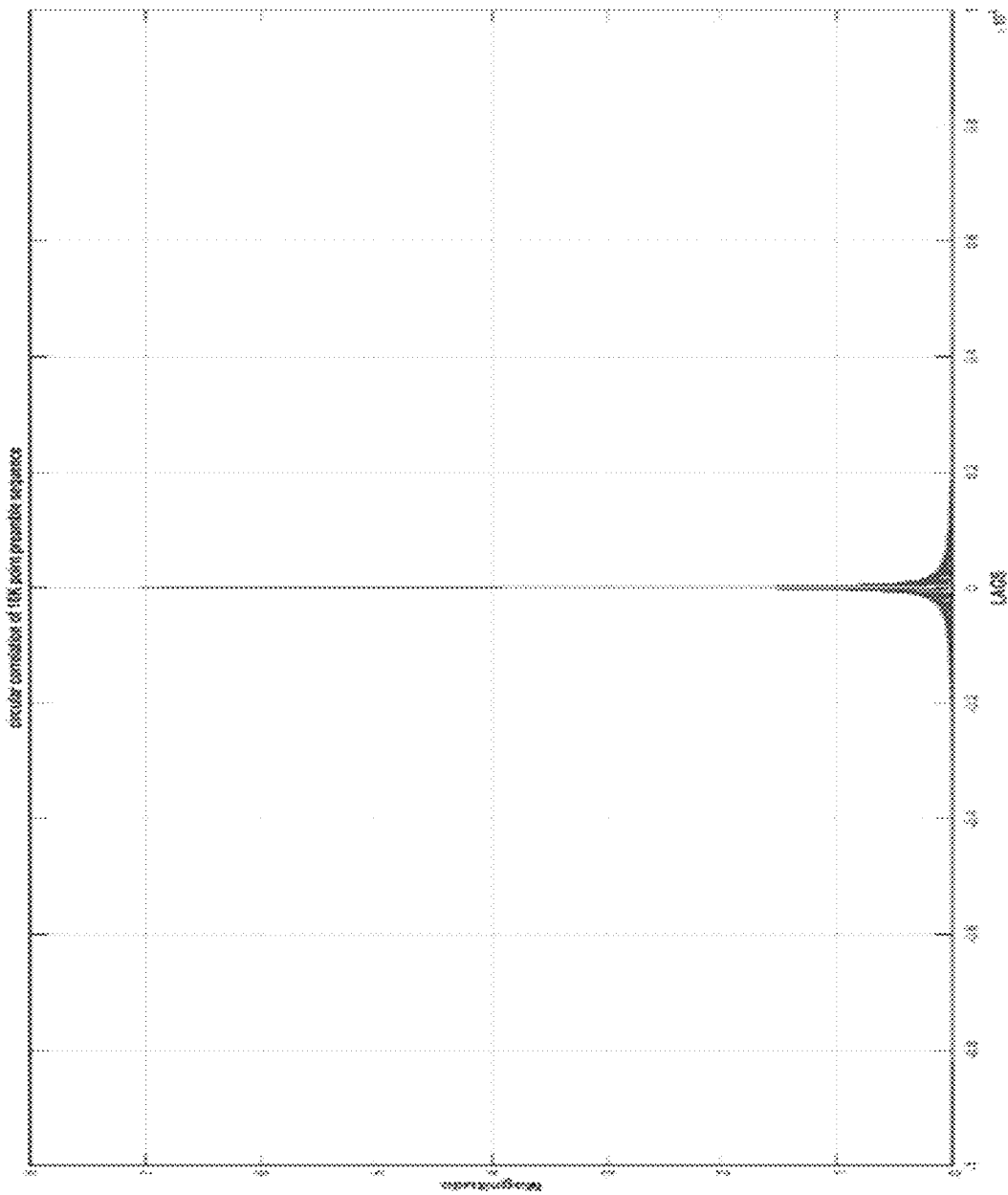
FIG. 9 is a graph showing correlation of 16k point transmitted preamble, in accordance with some embodiments.

FIGS. 8 and 9 show the circular correlations of 839-point basic preamble and 16K point interpolated version of the preamble that is transmitted.

Figure 10:
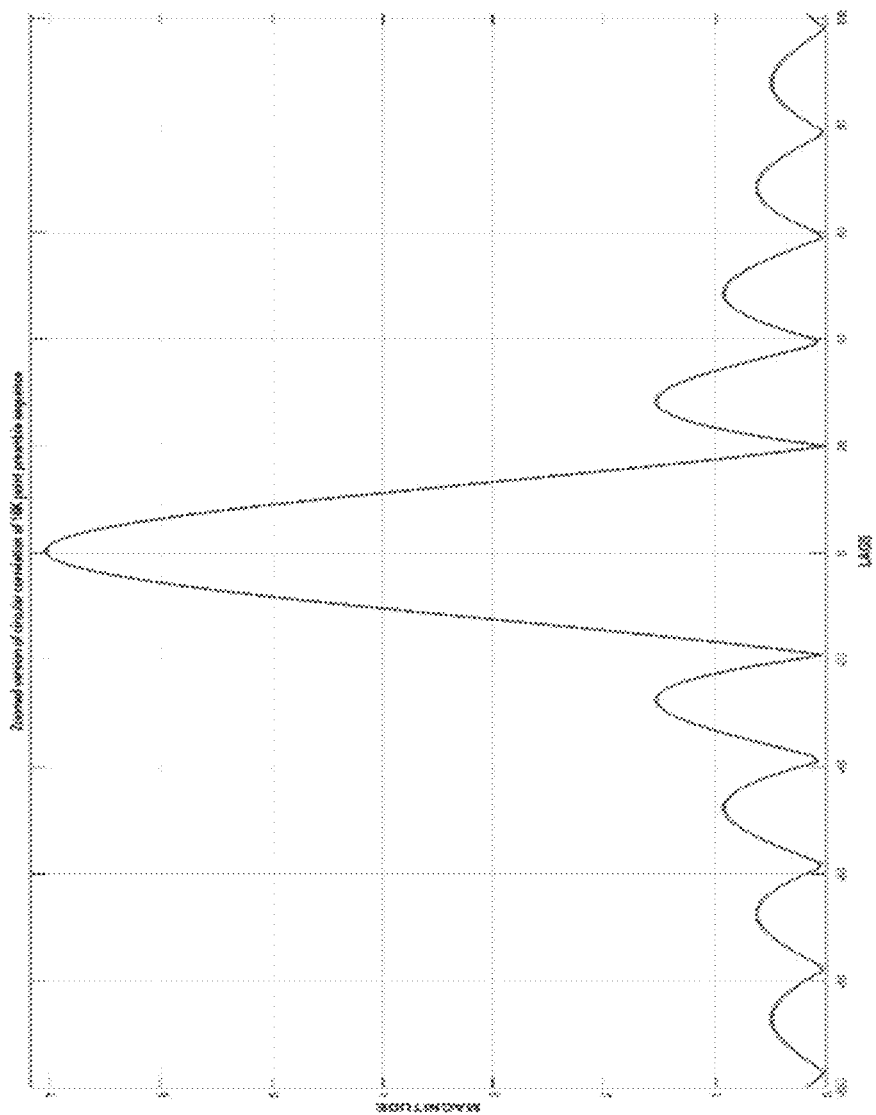
FIG. 10 is a zoomed version of FIG. 9.

Due to the ideal autocorrelation property of the basic preamble its circular correlation (FIG. 8) is an impulse. However due to the windowing effect of the 16K point preamble, its circular correlation (FIGS. 9 and 10) is sinc function defined in Eq1.

This is because windowing in frequency domain with a rectangular pulse equates to convolution in time domain with sinc pulse Property2: Magnitudes of the peaks of circular correlation of a preamble and its up sampled version are proportional by a factor determined by the up-sampling factor Let $P_{mag}$ be the magnitude of the peak P from 1024-point circular correlation obtained at module (1) of FIG. 1 and $Q_{mag}$ be the peak magnitude from module (2)

Then $$\frac{Pmag}{Qmag} = \xi, \text{a known constant} \quad \text{Eq 2}$$

Algorithm

The steps involved in the proposed method are as follows

Figure 11:
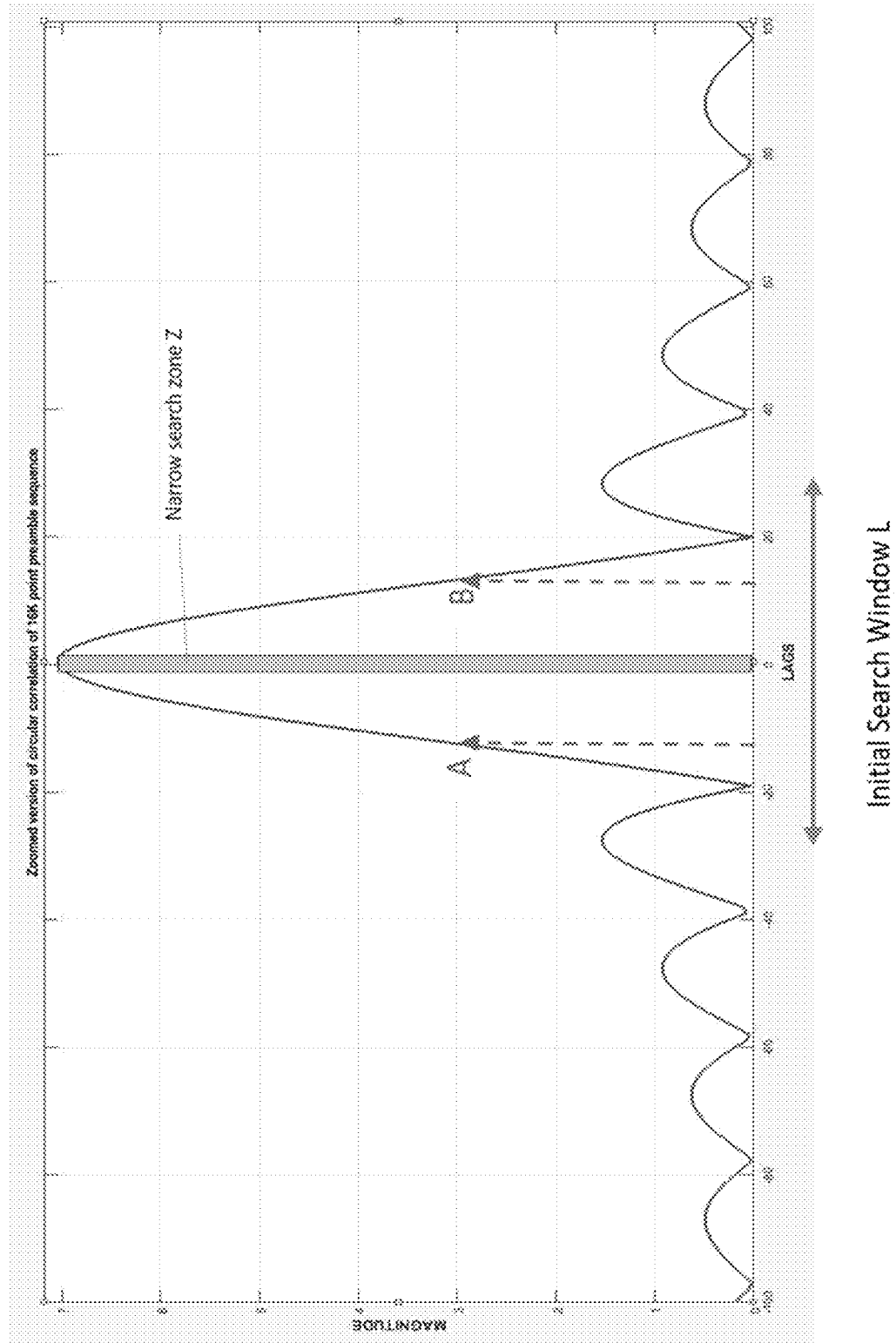
FIG. 11 is a graph showing a peak at the center of a search window, in accordance with some embodiments.

Define a search window L within which the peak Q is located, with the center of the search window S=16P Define two points A and B that are equidistant on either side of S Use Grouped FFT method to compute the transformed outputs at points A and B Choose between point A and B, whichever has greater magnitude Use the magnitude and index from step 4 and the equations Eq1 and Eq2 to define a narrow search zone Z Compute transformed outputs with in the Z Find the position of the max from above step Case 1: When peak is in the center of search window, shown in FIG. 11.

Figure 12:
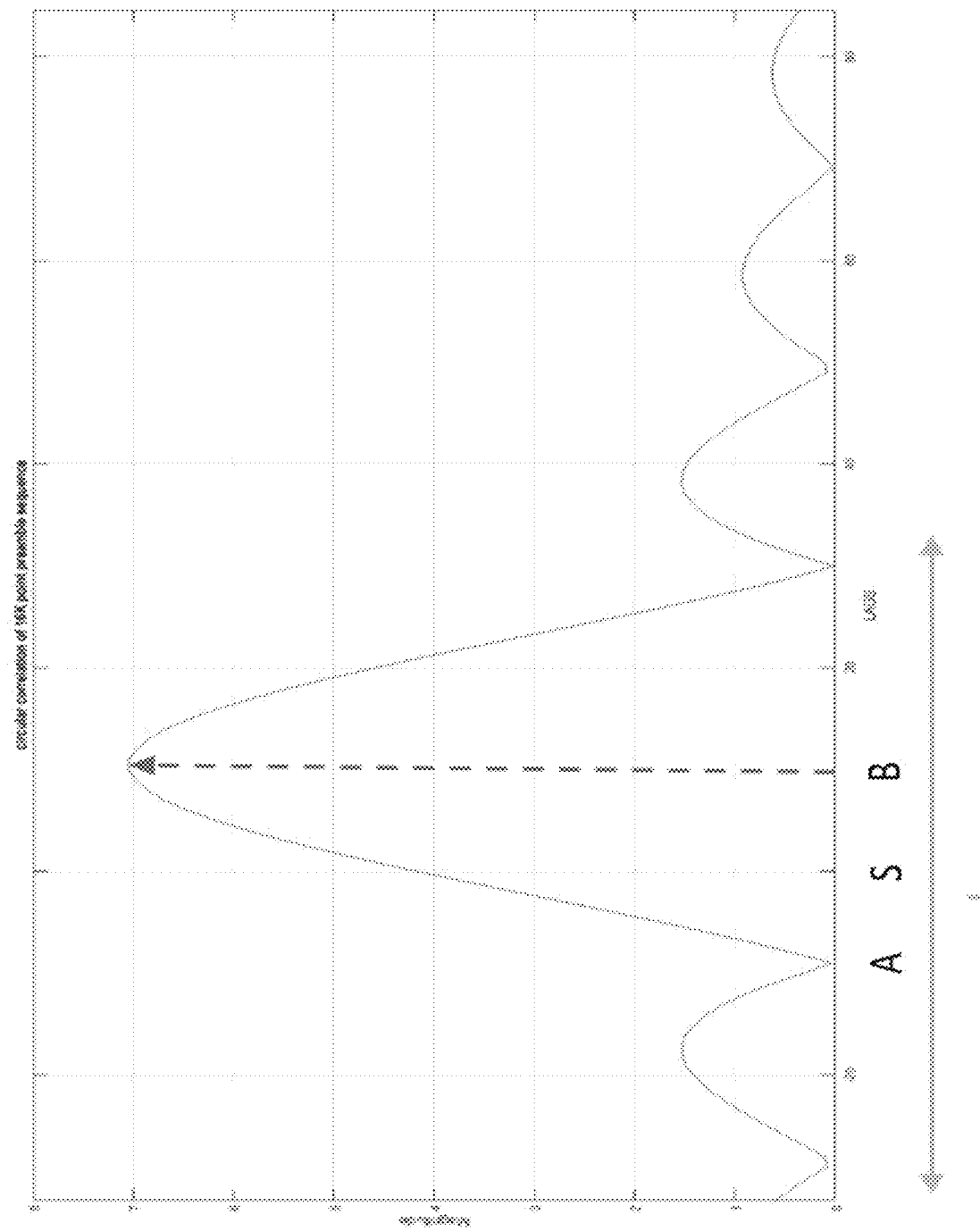
FIG. 12 is a graph showing a peak at the right side of a search window, in accordance with some embodiments.

Case 2: When peak is in the right side of search window, shown in FIG. 12.

Figure 13:
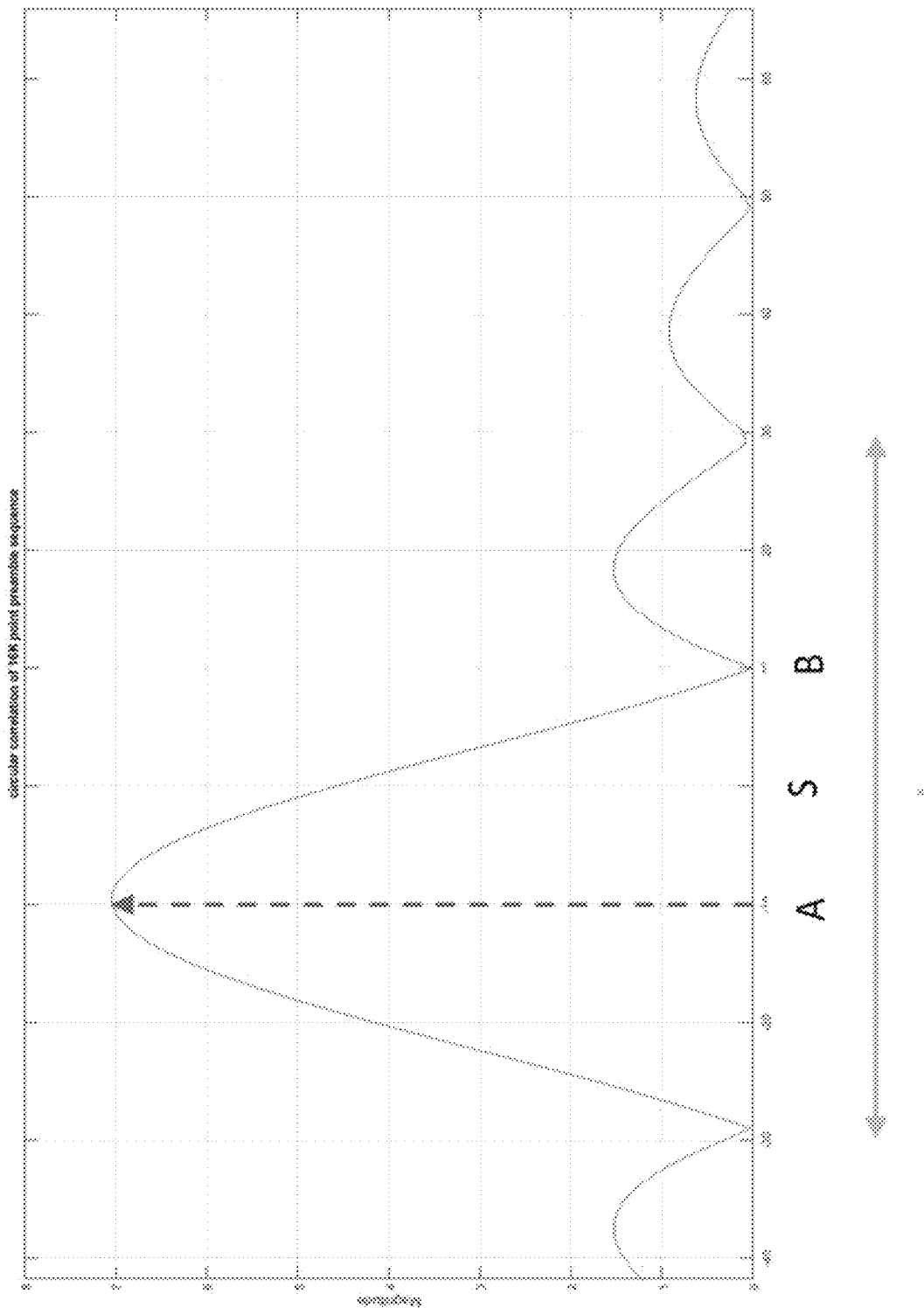
FIG. 13 is a graph showing a peak at the left side of a search window, in accordance with some embodiments.

Case 3: when peak is in the left side of search window, shown in FIG. 13.

Step-Wise Peak Search

Figure 14:
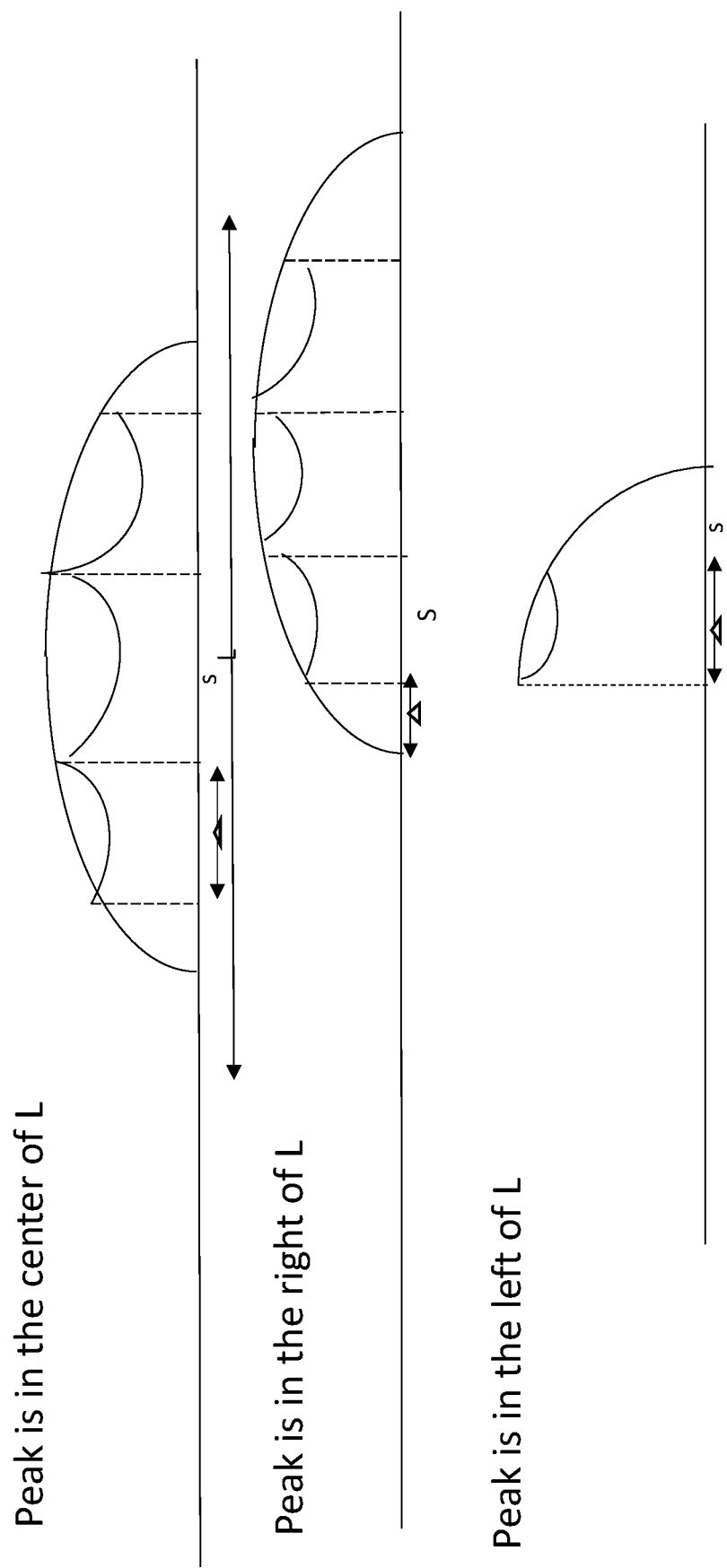
FIG. 14 is a set of graphs showing stepwise peak search steps, in accordance with some embodiments.

Under the Rayleigh and Rician channel conditions, the central lobe will not be symmetric about the peak. Under such conditions, stepwise peak search can be used to find the peak. This method is also computationally efficient, and is shown in FIG. 14.

Stepwise Peak Search Steps

Let S be the center of the search window. S=16P, where P is the peak position obtained from 1024 point correlation.

Choose a Point A (value A is empirically chosen) that is at the left of the S such a way that we definitely capture a point in the left half of the main lobe in spite of the movement of the peak anywhere in the search window.

From Point A move to the right in steps of A and compute transformed output at each of those steps.

Stop the movement to the right when the current transformed output is lesser than the previous. This indicates that we have just passed the peak.

Move backwards in smaller steps or step of one till we find the peak.

Step wise peak search reduces the number of transformed outputs to be computed to less than one-third for each peak.

Example of Complexity Reduction

Figure 15:
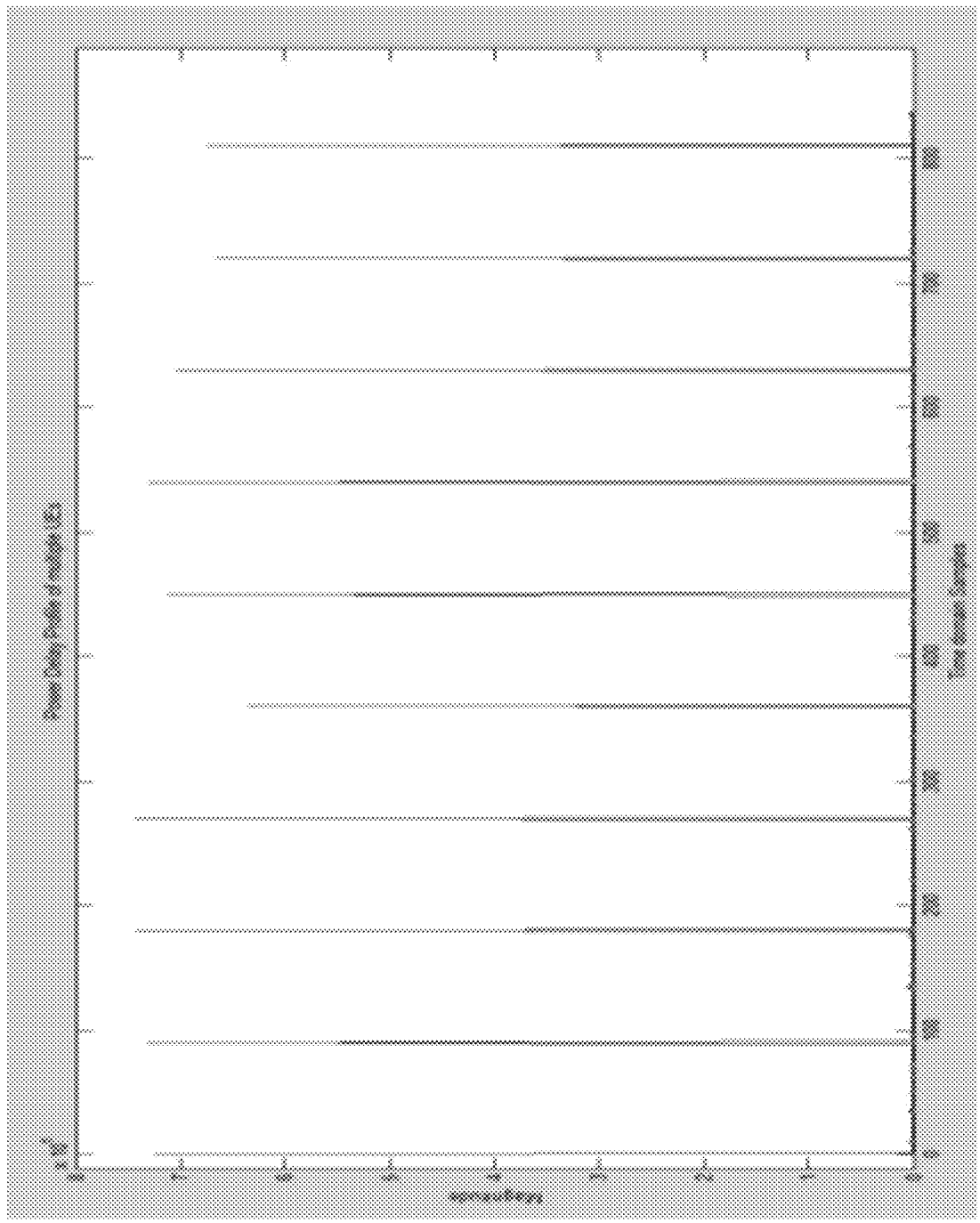
FIG. 15 is a graph showing multiple correlation peaks from multiple UEs, in accordance with some embodiments.

In a typical real time PRACH processing we need to detect multiple peaks as shown in FIG. 15.

Let L=60, Num Peaks to be detected=16, Z=4

For each peak we need only 6 transformed outputs to be computed that include 4 points in the narrower search zone Z and two for points A and B.

So totally only 6*16=96 transformed outputs need to be computed

Figure 16:
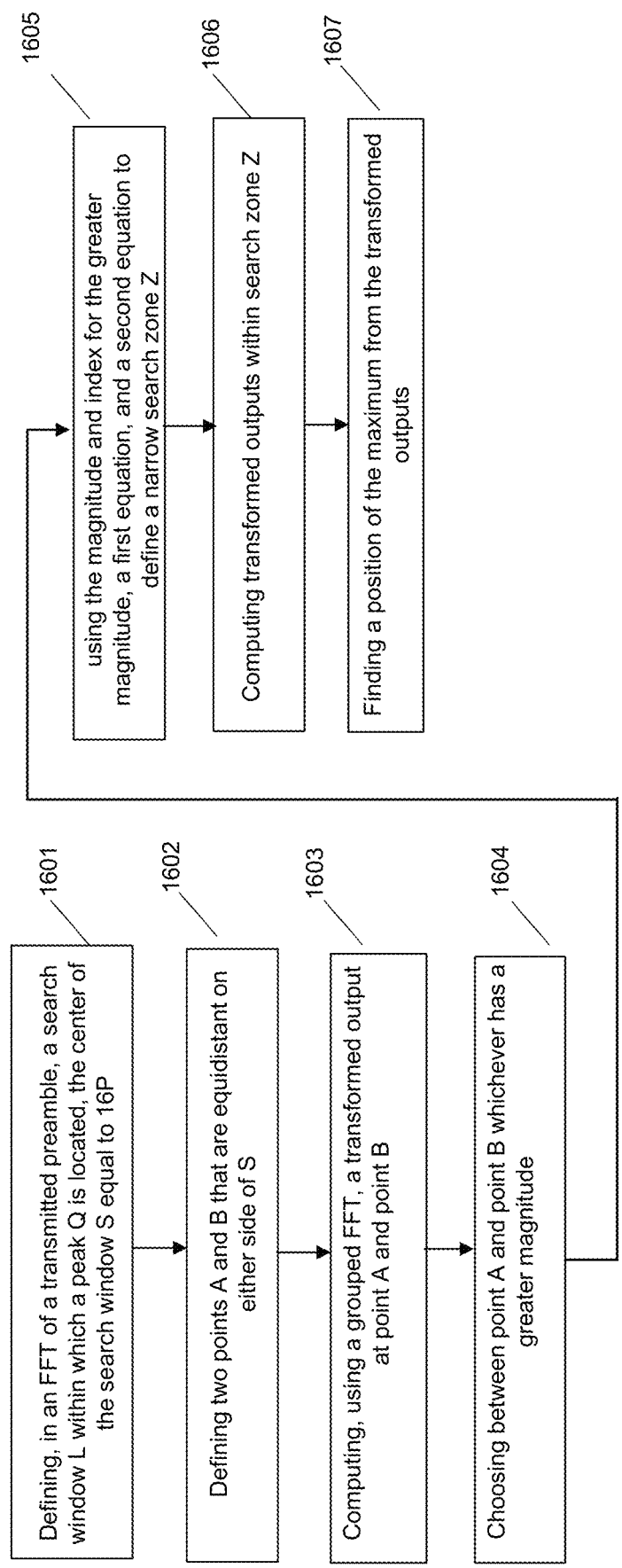
FIG. 16 is a flow diagram for using a sparse IFFT algorithm for BRACH, in accordance with some embodiments.

FIG. 16 is a flow chart of a method using a sparse IFFT algorithm for Physical Random Access Channel (PRACH). The method includes defining, in an FFT of a transmitted preamble, a search window L within which a peak Q is located, the center of the search window S equal to 16P (1601); defining two points A and B that are equidistant on either side of S(1602); computing, using a grouped FFT, a transformed output at point A and point B(1603); choosing between point A and point B whichever has a greater magnitude (1604); using the magnitude and index for the greater magnitude, a first equation, and a second equation to define a narrow search zone Z (1605); computing transformed outputs within search zone Z (1606); and finding a position of the maximum from the transformed outputs (1607).

Figure 17:
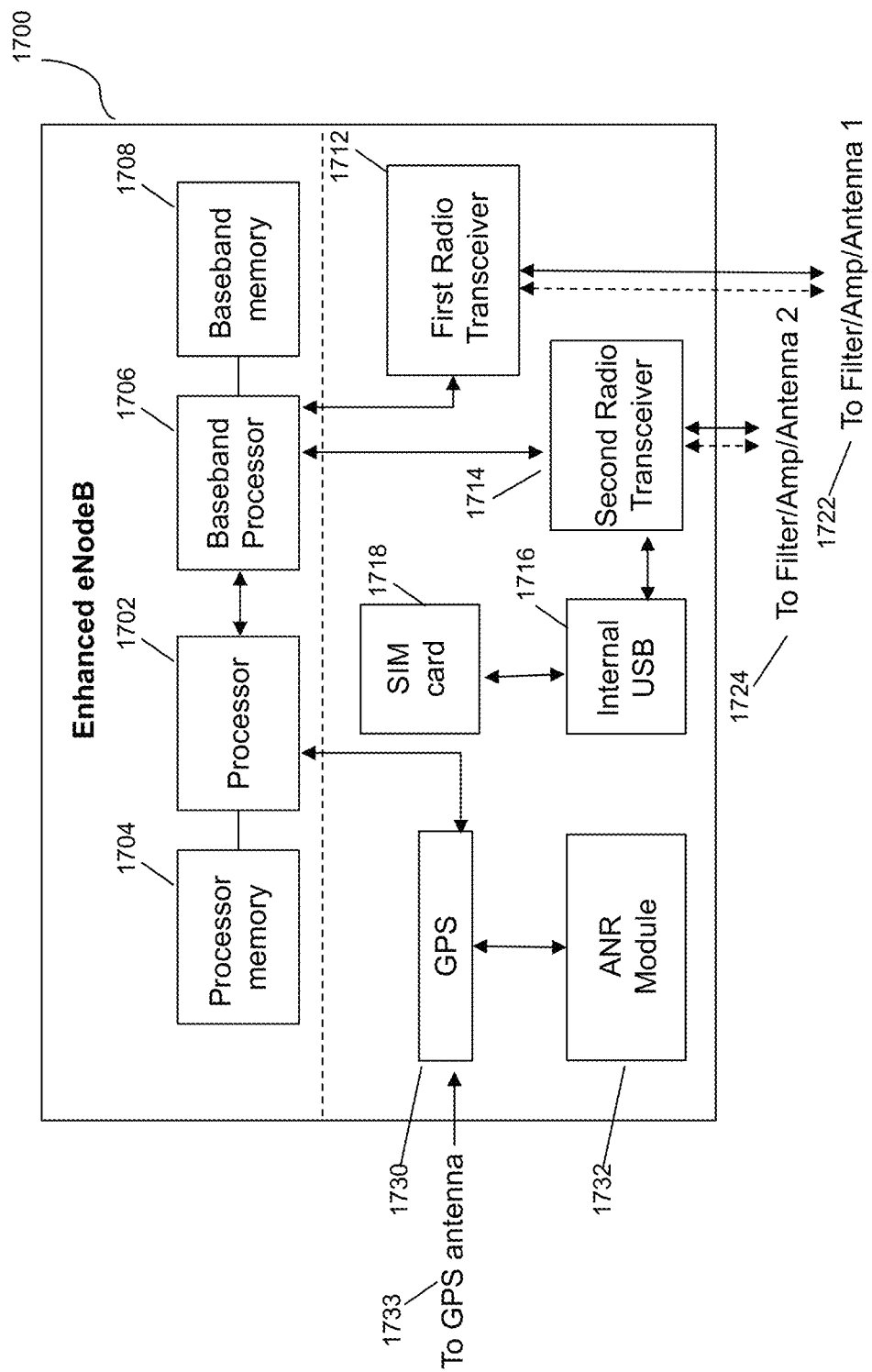
FIG. 17 is an enhanced eNodeB for performing the methods described herein, in accordance with some embodiments.

FIG. 17 is an enhanced eNodeB for performing the methods described herein, in accordance with some embodiments. Mesh network node 1700 may include processor 1702, processor memory 1704 in communication with the processor, baseband processor 1706, and baseband processor memory 1708 in communication with the baseband processor. Mesh network node 1700 may also include first radio transceiver 1712 and second radio transceiver 1714, internal universal serial bus (USB) port 1716, and subscriber information module card (SIM card) 1718 coupled to USB port 1716. In some embodiments, the second radio transceiver 1714 itself may be coupled to USB port 1716, and communications from the baseband processor may be passed through USB port 1716. The second radio transceiver may be used for wirelessly backhauling eNodeB 1700.

Processor 1702 and baseband processor 1706 are in communication with one another. Processor 1702 may perform routing functions, and may determine if/when a switch in network configuration is needed. Baseband processor 1706 may generate and receive radio signals for both radio transceivers 1712 and 1714, based on instructions from processor 1702. The steps described herein could be performed at the baseband processor 1706, or, in some embodiments, at processor 1702. In some embodiments, processors 1702 and 1706 may be on the same physical logic board. In other embodiments, they may be on separate logic boards.

Processor 1702 may identify the appropriate network configuration, and may perform routing of packets from one network interface to another accordingly. Processor 1702 may use memory 1704, in particular to store a routing table to be used for routing packets. Baseband processor 1706 may perform operations to generate the radio frequency signals for transmission or retransmission by both transceivers 1710 and 1712. Baseband processor 1706 may also perform operations to decode signals received by transceivers 1712 and 1714. Baseband processor 1706 may use memory 1708 to perform these tasks.

The first radio transceiver 1712 may be a radio transceiver capable of providing LTE eNodeB functionality, and may be capable of higher power and multi-channel OFDMA. The second radio transceiver 1714 may be a radio transceiver capable of providing LTE UE functionality. Both transceivers 1712 and 1714 may be capable of receiving and transmitting on one or more LTE bands. In some embodiments, either or both of transceivers 1712 and 1714 may be capable of providing both LTE eNodeB and LTE UE functionality. Transceiver 1712 may be coupled to processor 1702 via a Peripheral Component Interconnect-Express (PCI-E) bus, and/or via a daughtercard. As transceiver 1714 is for providing LTE UE functionality, in effect emulating a user equipment, it may be connected via the same or different PCI-E bus, or by a USB bus, and may also be coupled to SIM card 1718. First transceiver 1712 may be coupled to first radio frequency (RF) chain (filter, amplifier, antenna) 1722, and second transceiver 1714 may be coupled to second RF chain (filter, amplifier, antenna) 1724.

SIM card 1718 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 1700 is not an ordinary UE but instead is a special UE for providing backhaul to device 1700.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 1712 and 1714, which may be Wi-Fi 1702.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 1702 for reconfiguration.

A GPS module 1730 may also be included, and may be in communication with a GPS antenna 1732 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 1732 may also be present and may run on processor 1702 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for enhancing UE position accuracy using Physical Random Access Channel (PRACH), the method comprising:
   receiving a preamble signal r(n) having a predetermined sampling frequency and a predetermined length;
   performing signal conditioning on r(n) to provide a r_centered(n) signal;
   down sampling the r_centered(n) signal by a factor of 24 and performing antialiasing filtering to provide a y(n) signal;
   correlating the down sampled version of the received preamble y(n) with a reference preamble sequence c(n) using a Fast Fourier transform (FFT) method to provide correlation output Ryc;
   using a peak value P of the correlation output Ryc to detect a preamble ID and a timing advance at a resolution of 16Ts, wherein a Ts is 1/30720000 seconds;
   constructing a sequence s(n) by segmenting r_centered(n) for length L around an index P*24, wherein L is a number of Lags;
   performing time domain interpolation of c(n) around index P to obtain a sequence c_interpolated(n);
   performing time domain interpolation between sequences s(n) and c_interpolated(n);
   detecting a peak position Q of the correlation; and
   deriving TA as P*24 L/2+q in terms of Ts, wherein TA is a Timing Advance and q is an offset value.

2. The method of claim 1 wherein the preamble signal predetermined sampling frequency comprises 30.72 Million samples per second (sps).

3. The method of claim 1 wherein the preamble signal predetermined length comprises 27744 samples in length.

4. The method of claim 1 further comprising conditioning the preamble signal after the receiving a preamble signal.

5. The method of claim 4 wherein conditioning the preamble includes removing a cyclic prefix and extracting only a preamble sequence.

6. The method of claim 4 further comprising positioning of the signal in the frequency domain by a factor n_PRB_Offset, wherein the signal is shifted in frequency by the n_PRB_Offset so that the signal is centered about Direct Center (DC).

7. The method of claim 1 further comprising correlating the sequence y(n) with the reference preamble sequence c(n) using the FFT method Ryc=ifft{Y(k)·C*(k)}, where Y(k) and C(k) are 1024-point FFT of y(n) and c(n) respectively.

* * * * *